United States Patent
Kilgore

(10) Patent No.: US 7,046,646 B2
(45) Date of Patent: May 16, 2006

(54) METHOD AND APPARATUS FOR SIMPLE PPP HANDOFF FOR MOBILE USERS

(75) Inventor: Brian Kilgore, Melbourne, FL (US)

(73) Assignee: IPR Licensing, Inc., Wilmington, DE (US)

(*) Notice: Subject to any disclaimer, the term of this patent is extended or adjusted under 35 U.S.C. 154(b) by 685 days.

(21) Appl. No.: 09/771,929

(22) Filed: Jan. 29, 2001

(65) Prior Publication Data

US 2002/0101841 A1   Aug. 1, 2002

(51) Int. Cl.
*H04Q 7/00* (2006.01)

(52) U.S. Cl. ............... 370/331; 370/335; 370/336; 370/341; 455/432.1; 455/436; 709/227

(58) Field of Classification Search ........ 370/331–337, 370/341–347, 349, 310, 311; 455/436–442, 455/432.1; 709/239, 236, 223, 219, 227
See application file for complete search history.

(56) References Cited

U.S. PATENT DOCUMENTS

| | | | |
|---|---|---|---|
| 5,673,259 A | 9/1997 | Quick, Jr. .................. 370/342 |
| 5,708,655 A | 1/1998 | Toth et al. .................. 370/313 |
| 5,713,075 A | 1/1998 | Threadgill et al. .......... 455/427 |
| 5,809,070 A | 9/1998 | Krishnan et al. ........... 375/222 |
| 5,878,343 A | 3/1999 | Robert et al. ............... 455/424 |
| 5,970,059 A | 10/1999 | Ahopelto et al. ........... 370/338 |
| 5,978,386 A | 11/1999 | Hamalainen et al. ....... 370/466 |
| 5,999,811 A | 12/1999 | Molne ......................... 455/432 |
| 6,115,615 A | 9/2000 | Ota et al. .................... 455/553 |
| 6,377,556 B1* | 4/2002 | Lioy et al. .................. 370/310 |
| 6,507,567 B1* | 1/2003 | Willars ....................... 370/321 |
| 6,580,699 B1* | 6/2003 | Manning et al. ............ 370/331 |
| 6,651,105 B1* | 11/2003 | Bhagwat et al. ............ 709/239 |
| 6,708,031 B1* | 3/2004 | Purnadi et al. ............. 455/436 |
| 6,766,168 B1* | 7/2004 | Lim ........................ 455/435.1 |
| 6,801,509 B1* | 10/2004 | Chuah et al. ............... 370/328 |
| 6,876,640 B1* | 4/2005 | Bertrand et al. ............ 370/331 |
| 6,879,830 B1* | 4/2005 | Vollmer et al. ............. 455/442 |
| 2002/0006132 A1* | 1/2002 | Chuah et al. ............... 370/401 |
| 2002/0085514 A1* | 7/2002 | Illidge et al. ............... 370/329 |
| 2003/0224792 A1* | 12/2003 | Verma et al. ............... 455/436 |

* cited by examiner

*Primary Examiner*—Steven Nguyen
*Assistant Examiner*—Roberta Shand
(74) *Attorney, Agent, or Firm*—Hamilton, Brook, Smith & Reynolds, P.C.

(57) ABSTRACT

A mobile station is coupled to a first base station via a first wireless connection while in the zone of the first base station zone. Through the first base station and in conjunction with a PPP session manager, the PPP session manager establishes a first link of a PPP session to a remote server across a data network having mobile station handoff capability. When moving into the zone of a second base station and in conjunction with the PPP session manager, the PPP session manager creates a second link of the PPP session. The first and second links take different paths through the data network. The PPP session manager releases the first link while preserving the PPP session.

19 Claims, 4 Drawing Sheets

METHOD AND APPARATUS FOR SIMPLE PPP HANDOFF FOR MOBILE USERS

BACKGROUND OF THE INVENTION

In wireless data communication networks, it is foreseeable that mobile station users will travel from one base station zone to another base station zone while using the same application supported by a remote server on a computer network, such as the Internet. Thus, the base stations change, but the remote server supporting the application remains the same.

A personal computer user accessing a remote electronic mail (email) account on a moving train provides a good example of a wireless data communication application. It is desirable for the user that the session be uninterrupted, meaning that neither disconnection nor retraining occur while reading and/or responding to received email. Disconnection means that a loss of communication with the remote server has occurred. Retraining means that the wireless modems supporting the wireless communication has to be retrained. Retraining may also require instantiating a new point-to-point protocol (PPP) session over a new network path from the remote server through the next base station.

In network environments having a circuit switched infrastructure composing much of today's networks, a base station controller (BSC) switches a circuit in a base transceiver station (BTS) to maintain a persistent state during the duration of a call. When the mobile station moves to a next BTS zone, as described above, the BSC switches circuits in the corresponding BTS, for, again, the duration of the call or until the mobile station enters yet another BTS zone.

FIG. 1 is a schematic diagram of a network 100 using prior art circuit switching technology. A mobile station 105 includes a personal computer (PC) 110 coupled to a modem 120. The modem 120 provides for wireless communications to base stations, BTS 1 130a and BTS2 130b. Each of the base stations is coupled to a base station controller (BSC) 140. The base station controller 140 is further coupled to a gateway 150. The gateway 150 provides network communications to a wide area network, such as the Internet.

The mobile station 105 initially establishes a wireless link 123 to BTS1. The wireless link 123 is part of a first link 143 that spans from the mobile station 105 to the gateway 150.

The base station controller 140 supports the first link 143 by allocating channels for the entire duration of the call between the mobile station 105 and the gateway 150 while the mobile station 105 communicates with a remote server (not shown). A first circuit identifier ("cid") 132 identifies the circuits that remain in the persistent state for the entire duration of the call.

When the mobile station 105 moves to a zone within range of BTS2 130b, the mobile station 105 creates a second wireless connection 126 to BTS2 130b. The second wireless connection 126 is part of a second link 146 that spans between the mobile station 105 and the gateway 150. Here, the base station controller 140 allocates a second set of channels for the entire duration of the call. The second set of allocated channels are identified by a second circuit identifier 64. At a point where one of the network elements—the mobile station 105, base station 130a, base station controller 140, or gateway 150—determines that the first link 143 should be terminated, the base station controller 140 deallocates the circuits identified by the first circuit identifier 132. The circuit identified by the second circuit identifier 64 continues to remain in a persistent state throughout the duration of the call.

SUMMARY OF THE INVENTION

Typical wireless data communications systems use a traditional circuit switched approach to user mobility. Proprietary protocols between base stations and a base station controller (BSC) handle the mobile user handoff between base stations, while the underlying circuit switched network handles the distribution of circuits identified by their circuit identifier from the base station controller to a gateway. Thus, a circuit is allocated at the beginning of a PPP session from the user's personal computer (PC) to the gateway and is maintained throughout the duration of the connection through a respective base station. When the mobile station moves to another base station zone, the underlying proprietary protocol must establish a new circuit between the new base station and the base station controller, and the circuit switched distribution network must establish the correct association between the PPP session and the new circuit.

In most data communication applications, data are packetized and generally transmitted in bursts. In the example where the mobile station user reads remote emails, all received emails are sent in bursts of data packets from the remote server to the mobile station. However, because the user reads the emails and takes action on the emails (e.g., deleting, responding to, or forwarding the emails) on a relatively slow basis, the packet bursts occur infrequently. Therefore, it is advantageous to re-allocate transmission resources during the reading/action time interval to other users to optimize the utilization of the wireless link.

The problem with the switched circuit network approach to user mobility is that the packet switched wireless system has no underlying switched circuits with circuit identifiers to handle the mobile user handoff between base stations and to the gateway.

The well-known point-to-point protocol (PPP), though originally designed for computing devices that are connected to fixed network connections, can be applied to wireless networking. The PPP protocol establishes a session between the remote server and mobile station. When applied to mobile stations in a packet switched network that travel between base station zones, the PPP protocol must create a separate PPP session to account for a new route being taken by the data packets. Therefore, second, third, fourth, and so on, PPP training periods are required for the new PPP sessions. During the training periods, the networking devices learn new end-to-end semantics (i.e., user authentication, new link transmission options, and new source and destination addresses) to allow the user continued access to the remote email server.

To obviate retraining periods, the present invention creates a second link path across the network when entering a new BTS zone. However, rather than the second link creating a new PPP session, the second link path is part of the same PPP session that was initially established between the mobile station and the remote server. So, at a given time in a given session, there may be more than one link path across the network between the mobile station and the remote server. Link tables are augmented with the new path information, allowing the PPP session to be maintained while the mobile station interacts with the remote server. In this way, second, third, fourth, etc. retraining periods are not required to be executed. It should be understood that even though a PPP session is maintained, the underlying circuits throughout the link path in the network are switched, only being used during data packet transmission.

In one embodiment of the present invention, a multi-link point-to-point protocol (MLPPP) is employed for instantiating new link paths and removing old link paths in a network in a manner maintaining the PPP session. The MLPPP protocol was designed to add permanent link paths in parallel for large banks of modems, where the modems are typically coupled to a single stationary computer. The MLPPP protocol, therefore, increases data throughput across the network. For example, two 56 kbaud modems can be placed in parallel to achieve an effective 112 kbaud rate. However, for use in wireless data communications, the principles of the present invention use the MLPPP protocol for temporary parallelism of link paths.

Accordingly, a mobile station is coupled to a first base station via a first wireless connection while in the zone of the first base station zone. Through the first base station and in conjunction with a PPP session manager, the PPP session manager establishes a first link of a PPP session to a remote server across a data network having packet switching capability. When moving into the zone of a second base station and in conjunction with the PPP session manager, the PPP session manager creates a second link of the PPP session. The first and second links take different paths through the data network. The PPP session manager releases the first link while preserving the PPP session.

Optionally, the PPP session uses a standardized multi-link point-to-point protocol (MLPPP).

The PPP session manager typically releases the first link in response to determining that the second link better supports the PPP session than the first link. In one embodiment, the PPP session manager determines that the second link better supports the PPP session than the first link as a function of the signal-to-noise ratios of each path. The PPP session manager optionally creates the second link by employing an underlying radio-link protocol to establish the second wireless connection in the second path. The PPP session manager creates and removes links as it enters other base station zones and typically maintains at least one data table supporting the PPP session.

The PPP session manager may be deployed in the personal computer, wireless modem, or gateway. The PPP session manager may be capable of creating and maintaining data tables on the same network device or in remote network devices.

Figure 1:
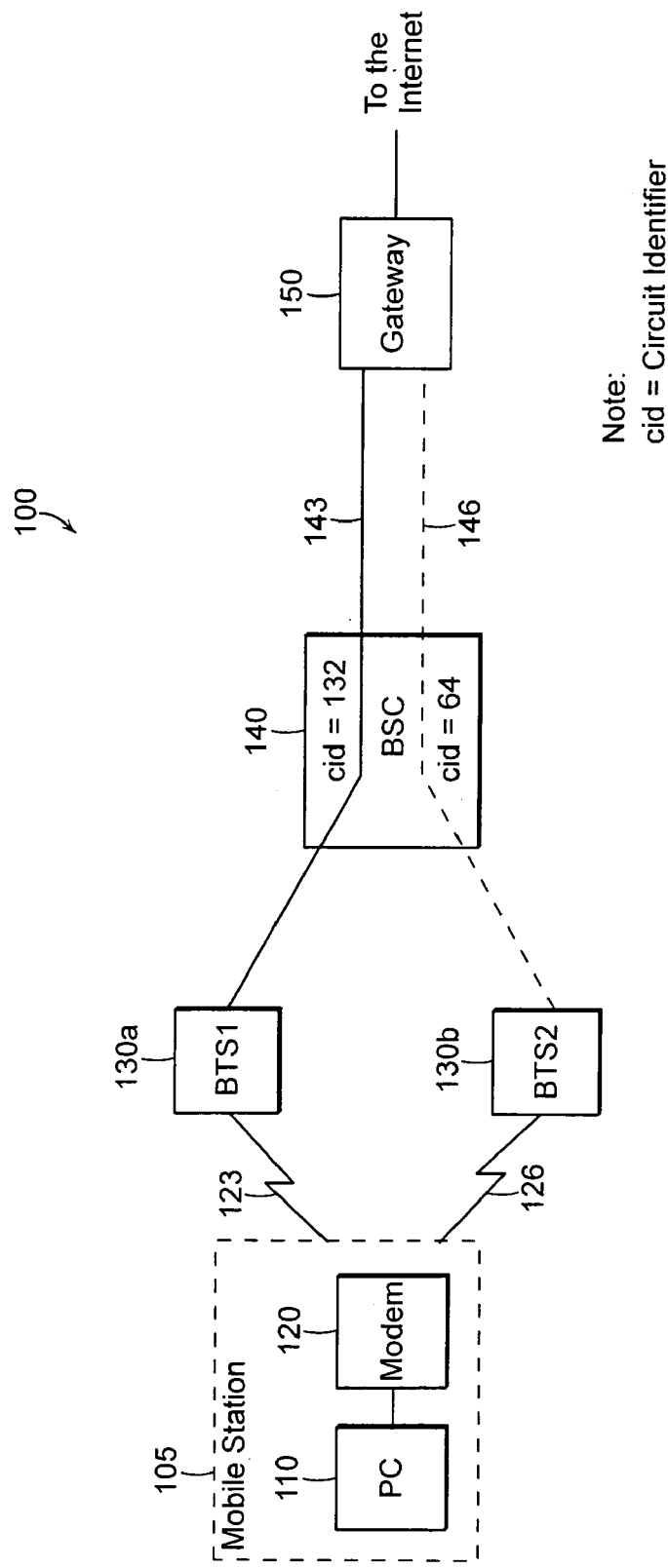
FIG. 1 is a block diagram of a prior art circuit switching network.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The principles of the present invention provide for managing dynamic links with a point-to-point protocol (PPP) over a data packet network. One connection in each of the dynamic links is a wireless connection between a base station and a mobile station. Managing the links includes handing off a first link to a next link in a manner that preserves a PPP session.

By operating over a data packet (i.e., packet switched) network rather than a switched circuit network, the usage time of any circuit activated in the links to transmit a given packet between the mobile station and a remote server, for instance, is minimized. This is in contrast to a circuit switched network in which a circuit is allocated for the entire duration of a call between the mobile station and the remote server. Thus, in the packet switched case, a circuit employed to transmit the given packet can be allocated to other users when data is not transmitting between the mobile station and the remote server.

The PPP protocol effectuated is similar to the multi-link point-to-point protocol (MLPPP) but is adapted to managing dynamic links in a wireless data communication scenario. The MLPPP protocol is traditionally found in cases where increased data transmission rates are desired. MLPPP provides a means by which plural PPP links operate in parallel as part of a single PPP session. In this way, two or more modems can transmit data in parallel. Additionally, MLPPP provides redundancy by also allowing parallel data transmission as part of a single MLPPP session.

In the case of wireless data communications, however, according to the principles of the present invention, the MLPPP—or pseudo-MLPPP—provides a means by which a given PPP session is maintained when switching from one base station zone to a next base station zone. The advantage to preserving the given PPP session rather than instantiating a new PPP session is that end-to-end semantics are also preserved, which results in the eliminating training sessions beyond the initial training session for the given PPP session.

As part of the MLPPP protocol, at least one MLPPP correspondence table is typically maintained. The correspondence table(s) include session identifiers that are part of the same PPP session and their respective Internet protocol (IP) addresses that from the link paths.

The MLPPP protocol is integrated into a wireless communication process that maintains a high degree of data transfer rate efficiency. The process establishes links between the mobile station and base stations within range of the mobile station, where the links are learned from an underlying radio-link protocol that establishes the next wireless connection. When a new wireless link is brought on-line, the MLPPP correspondence table is updated with the added link information.

The process then makes a comparison between the first PPP link and the new PPP link to determine which link has better data transmission efficiency. Should the new link have better data transmission efficiency, then the older link is released in favor of the new PPP link in a manner that, again, preserves the same PPP session. It should be understood that the data transmission efficiency can be determined as a function of signal-to-noise ratio (SNR), data error rates (DER), power received level, or other suitable metric.

Figure 2:
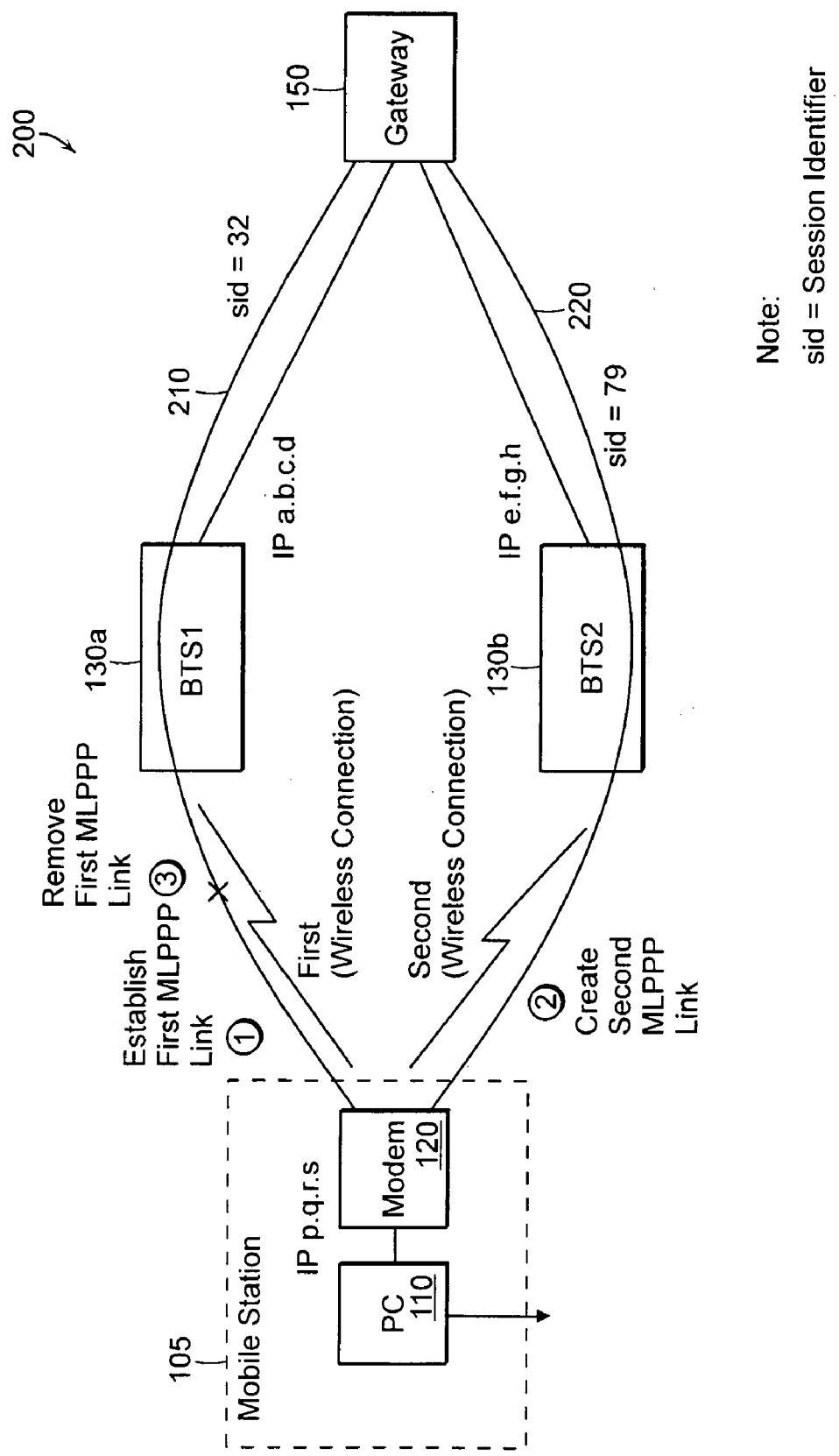
FIG. 2 is a block diagram in which the present invention is deployed.

FIG. 2 is a schematic diagram of an embodiment of a packet switched network 200 in which the base station controller 140 (FIG. 1) is not necessarily employed as part of a link connection between the mobile station 105 and the gateway 150, and the base stations are connected to the gateway 150 over a routed Internet protocol (IP) network. As in the circuit switched network of FIG. 1, the mobile station 105 also establishes wireless connections to the base stations 130a, 130b as it enters the respective base station zones. As shown, a first link 210 spans between the mobile station 105 and the gateway 150 through BTS1 130a and includes the wireless connection between the mobile station 105 and BTS1 130a. Also, a second link 220 spans between the mobile station 105 and the gateway 150 via BTS2 130b and includes the wireless connection between the mobile station 105 and BTS2 130b.

Both links 210 and 220 are point-to-point protocol (PPP) links. The first link 210 is identified by session identifier 32. The second link 220 is identified by session identifier 79.

Session identifier 32 includes typical source and destination (src, dst) IP address information for transmitting packets of data between the mobile station 105 and the gateway 150. Here, BTS1 130a has IP address a.b.c.d, and the mobile station 105 has IP address p.q.r.s. Thus, session identifier 32 identifies IP addresses a.b.c.d and p.q.r.s.

Session identifier 79 includes typical source and destination IP address information for transmitting data packets between the mobile station 105 and the gateway 150. In the case of session identifier 79, the IP addresses include the IP address for BTS2, e.fg.h., and the IP address of the mobile station, p.q.r.s.

Figure 3:
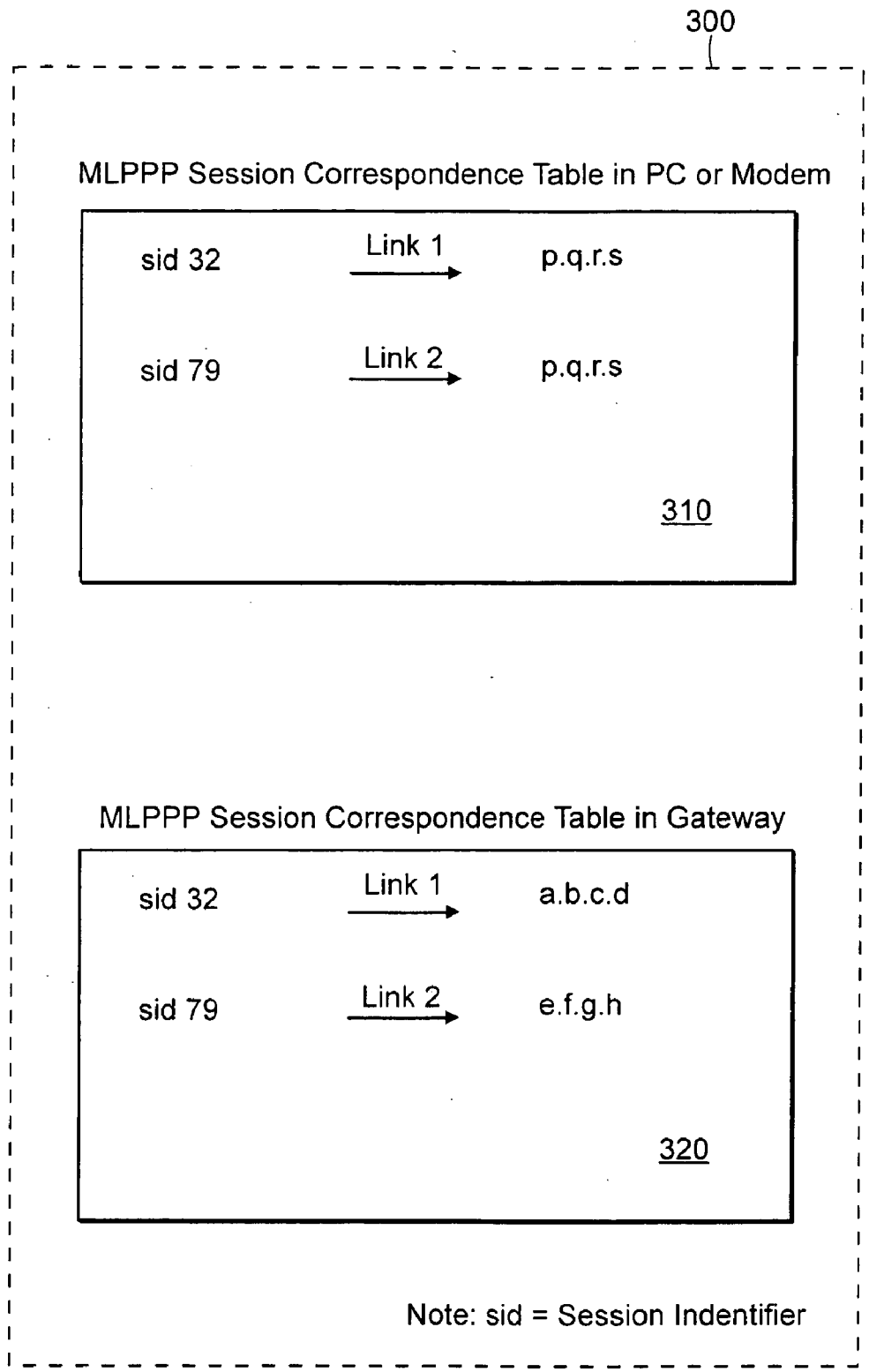
FIG. 3 is a block diagram of an MLPPP session correspondence tables supporting the PPP session in the network of FIG. 2.

FIG. 3 is an MLPPP session correspondence table 300 that includes the correspondences between the IP addresses of the network devices on the link endpoints and the session identifiers of FIG. 2. The MLPPP session correspondence table 300 is maintained at the gateway and either the PC or the modem depending on which device initiates the PPP session.

The MLPPP session correspondence table 310 includes information for transmitting data packets through the first connection in the links 210, 220. In particular, the PC 110 or modem 120 (FIG. 2) sends data packets via the first wireless connection using the session identifier 32. Similarly, the PC 110 or modem 120 sends data packets across the second wireless connection using the session identifier 79.

The MLPPP session correspondence table 320 stored in the gateway 150 uses a similar method of transmitting data packets. The gateway 150 sends data packets via the first link 210 using the IP address a.b.c.d specified by the session identifier 32.

Similarly, the gateway 150 sends data packets via the second link 220 using the IP address e.f.g.h identified by the session identifier 79.

In both cases, the base station and medium use a radio link protocol to complete the path and transmit the data packets over respective wireless links.

Thus, since the MLPPP session correspondence table has access to both session identifiers in the same table, a given PPP session can be preserved even if one of the links has been released.

Referring again to FIG. 2, in operation, the mobile station 105 establishes a first MLPPP link 210 to the gateway 150 that includes the wireless connection to BTS1 130a. As the mobile station 105 enters the zone within which it can communicate with BTS2 130b, the mobile station creates a second MLPPP link 220 with the gateway 150 that includes the wireless connection to BTS2. After establishing the second MLPPP link 220, the first MLPPP link 210 is released, leaving only the second MLPPP link 220. By using the MLPPP session correspondence table 300 (FIG. 3) to keep track of related PPP links, the same PPP session is maintained between BTS zones, which eliminates the need for retraining.

A PPP session manager at the gateway and the PC or modem uses handoff information to create and maintain the session correspondence tables 310, 320. It should be understood that a single PPP session manager can be employed in the PC, modem, or gateway and create and maintain the PPP session correspondence tables 310, 320 in the network device in which it is deployed or other network devices. Additionally, plural PPP session managers or portions of a PPP session manager may be deployed in plural network devices and operate in a distributed manner.

Figure 4:
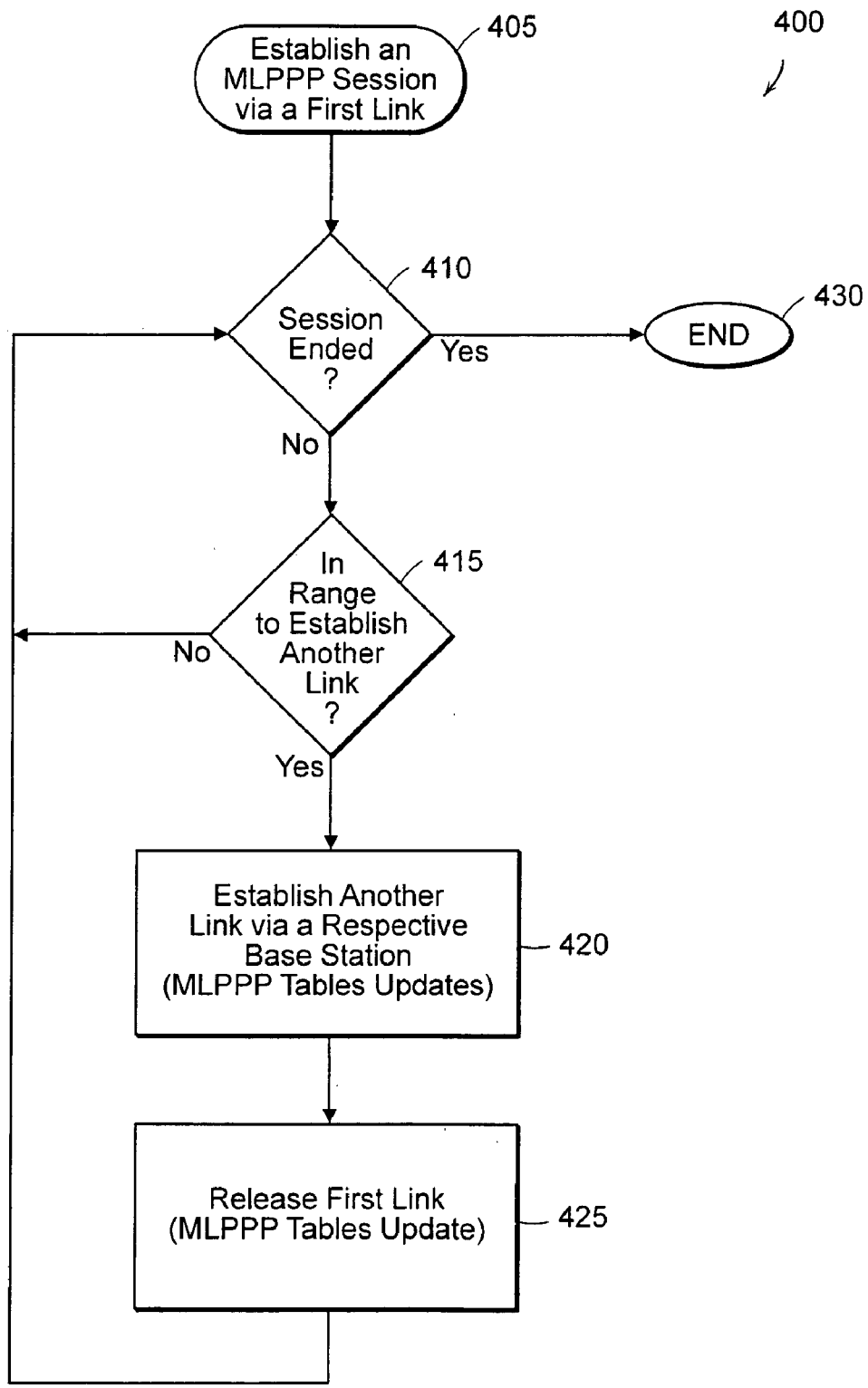
FIG. 4 is a flow diagram of an embodiment of a process of the MLPPP session of FIG. 2.

FIG. 4 is a flow diagram of an embodiment of the process just described. In step 405, the mobile station 105 establishes an MLPPP session via a first link 210. In step 410, a process 400 determines whether a request has been made to end the session. If the session is not ended, then process 400 continues in step 415.

In step 415, the process 400 determines whether the mobile station 105 is in range of another BTS to establish another link. If the mobile station is not in range of another BTS to establish another link, then the process returns to step 410. If the process 400 determines in step 415 that the mobile station 105 is in range of another BTS to establish another link, then the process 400 continues in step 420.

In step 420, the process 400 establishes another link via a respective base station. At this point, the MLPPP session correspondence table (e.g., table 300, FIG. 3) is updated to reflect the new link. Once the new link is operational, the first link is released and the MLPPP session correspondence tables are updated to reflect the release of the first link. Again, the PPP session is preserved while the new link is established and the old link is released. Following the release of the first link in step 425, the process 400 returns to step 410.

In step 410, if the process 400 determines that the session has ended, then the process continues to step 430 where the process ends.

It should be understood that the process 400 is executed by a processor in one of the networking devices in the packet switched network 200. Software loaded and executed by the processor is stored on a computer readable medium either locally or remotely and, if remotely, downloaded on an as-needed basis over the packet switched network 200. In addition, the process 400 may be distributed and executed by more than one processor, optionally located in plural networking devices. Various implementation details are within the teachings of the principles of the present invention, such as those required for the mobile station 105 to respond to queries from the gateway 150 to determine whether the mobile station 105 is within a new BTS zone.

The MLPPP session can be initiated by the modem 120, gateway 150, or PC 110. Changes to the process of FIG. 4 may be required to implement the process when initiated by these other networking devices, but should be understood by one of ordinary skill in the art by the respective descriptions following.

For a modem-initiated MLPPP session, there are two minor variations. First, the modem 120 terminates the PPP from the PC 110 and has another PPP session to the gateway 150. Second, the modem 120 can put requests into the PPP stream.

When the modem 120 initiates the MLPPP session, the steps to transfer the PPP session are as follows:
1. The modem 120 sends an MLPPP request to the gateway 150.
2. The modem 120 opens the second PPP connection through the new base station 130b.
3. After the second PPP connection has been established, the modem 120 drops the original PPP connection. At this point, the modem 120 and PC 110 are no longer associated with the first base station, BTS 1, but continue to communicate in the same MLPPP session.

Because the modem initiates the MLPPP session, no special code needs to be developed for the base stations, gateway or PC if they already support MLPPP. However, the code to insert messages into the PPP adds complexity to standard MLPPP code. Also, the modem 120 requires additionally memory to track multiple PPP connections (e.g., up to three) for each PPP to gateway session. Further, some data packets may be lost because MLPPP splits packets between the two PPP links.

In the case where the gateway 150 initiates the MLPPP session, the steps to transfer the PPP session are as follows:

1. The modem 120 sends a message outside the PPP connection to the gateway 150. This message contains the PPP session identifier and the new base station 130b destination address.
2. The gateway 150 initiates MLPPP and opens the second PPP connection through the new base station 130b.
3. After the second PPP link has been established, the gateway 150 releases the original PPP link 210.
4. The modem 120 disconnects from the first base station 130a. At this point, the modem 120 and PC 110 are no longer associated with the original base station 130a.

If the base station, gateway, and PC already support MLPPP, then special code is only needed on the gateway in the gateway-initiated MLPPP solution. Also, this solution tends to be simpler to implement than a mobile station 105 implemented MLPPP solution.

On the other hand, special code is needed to be written and stored on the gateway 150. Further, some data packets may be lost from the PC unless the code operating on the gateway has enough intelligence not to split the data packets across the different links. The new BTS indicates to the gateway 150 that a handoff is to occur from a previous BTS to the new BTS.

A third case is where the PC 110 initiates the MLPPP session. Here, the steps to transfer the PPP session are as follows:

1. The modem 120 sends a message outside the PPP session to the PC 110.
2. The PC 110 initiates a MLPPP session and opens the second PPP link 220. The modem 120 recognizes the new link as a second PPP connection from the same PC 110 and sends this connection through the new base station 130b.
3. After the second PPP link 220 has been established, the PC 110 releases the original PPP link 210.
4. The modem 120 disconnects from the first base station 130a. At this point, the modem 120 and PC 110 are no longer associated with the original base station 130a.

Here, where the PC 110 initiates the MLPPP session, special code is only needed on the PC 110 so long as the base stations, gateway, and PC already support MLPPP. As a practical matter, the special code, however, may have to completely replace any existing PPP code. Further, some data packets may be lost from the gateway 150 unless the PC were to have enough intelligence not to split the data packets across the different links. The gateway side of the code, therefore, has special code to prevent data packet loss. The wireless modem 120 indicates to the PC 110 that a handoff is to occur from a first wireless link to a second wireless link.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of preserving a point-to-point protocol (PPP) session over a data network having mobile station handoff capability, the method comprising:
    establishing a first link of the PPP session through a first path including a first wireless connection in the data network;
    creating a second link associated with the PPP session through a second path including a second wireless connection in the data network;
    establishing a correspondence between the first link and the second link prior to releasing the first link for uninterrupted communications during the PPP session; and
    releasing the first link while preserving the PPP session, the PPP session using a multi-link point-to-point protocol (MLPPP), normally used to add permanent link paths in parallel for large banks of modems coupled to a single stationary computer, to provide temporary parallelism of the first and second links.

2. The method as claimed in claim 1, wherein releasing the first link is in response to determining that the second path better supports the PPP session than the first path.

3. The method as claimed in claim 2, wherein determining that the second link better supports the PPP session than the first link includes determining the signal-to-noise ratios of each path.

4. The method as claimed in claim 1, wherein creating the second link includes employing an underlying radio-link protocol to establish the wireless connection in the second path.

5. The method as claimed in claim 1, repeating for other paths through the data network.

6. The method as claimed in claim 1, further including maintaining at least one data table supporting correspondence between the first link and the second link for use in preserving the PPP session.

7. An apparatus for preserving a point-to-point (PPP) session over a data network having mobile station handoff capability, comprising:
    a mobile station (i) coupled to a first base station via a first wireless connection over a first air interface in a first base station zone and (ii) coupled to a second base station via a second wireless connection over a second air interface in a second base station zone, the first base station being coupled to a remote server via the data network, the second base station being coupled to the remote server via the data network; and
    a PPP session manager (i) to establish a first link of the PPP session between the mobile station and the remote server via a first path including the first wireless connection, (ii) to create a second link of the PPP session between the mobile station and the remote server via a second path including the second wireless connection, (iii) to identify a correspondence between the first link and the second link prior to releasing the first link for uninterrupted communications during the PPP session, and (iv) to release the first link while preserving the PPP session, the PPP session using a multi-link point-to-point protocol (MLPPP), normally used to add permanent link paths in parallel for large banks of modems coupled to a single stationary computer, to provide temporary parallelism of the first and second links.

8. The apparatus as claimed in claim 7, wherein the PPP session manager releases the first link in response to determining that the second link better supports the PPP session than the first link.

9. The apparatus as claimed in claim 8, wherein the PPP session manager is notified by a radio link protocol (RLP) that the second link better supports the PPP session than the first link.

10. The apparatus as claimed in claim 9, wherein the radio link protocol determines that the second link better supports the PPP session than the first link as a function of the signal-to-noise ratios of each path.

11. The apparatus as claimed in claim 7, wherein the PPP session manager creates the second link by employing an underlying radio-link protocol to establish the second wireless connection in the second path.

12. The apparatus as claimed in claim 7, wherein the PPP session manager creates and removes links for other links through the data network.

13. The apparatus as claimed in claim 7 wherein the PPP session manager maintains at least one data table supporting correspondence between the first link and the second link for use in preserving the PPP session.

14. The apparatus as claimed in claim 13, wherein the PPP session manager resides in a personal computer supporting the PPP session.

15. The apparatus as claimed in claim 13, wherein the PPP session manager resides in a wireless modem supporting the PPP session.

16. The apparatus as claimed in claim 13, wherein the PPP session manager resides in a gateway supporting the PPP session.

17. An apparatus for preserving a point-to-point (PPP) session over a data network having mobile station handoff capability, comprising:
   means for establishing a first link of the PPP session through a first path including a first wireless connection in the data network;
   means for creating a second link associated with the PPP session through a second path including a second wireless connection in the data network;
   means for identifying a correspondence between the first link and the second link prior to releasing the first link for uninterrupted communications during the PPP session; and
   means for releasing the first link while preserving the PPP session, the PPP session using a multi-link point-to-point protocol (MLPPP), normally used to add permanent link paths in parallel for large banks of modems coupled to a single stationary computer, to provide temporary parallelism of the first and second links.

18. A computer-readable medium having stored thereon sequences of instructions, the sequences of instructions including instructions, when executed by a processor, causes the processor to perform:
   establishing a first link of a PPP session through a first path including a first wireless connection in a data network having mobile station handoff capability;
   creating a second link associated with the PPP session through a second path including a second wireless connection in the data network;
   identifying a correspondence between the first link and the second link prior to releasing the first link for uninterrupted communications during the PPP sessions; and
   releasing the first link while preserving the PPP session, the PPP session using a multi-link point-to-point protocol (MLPPP), normally used to add permanent link paths in parallel for large banks of modems coupled to a single stationary computer, to provide temporary parallelism of the first and second links.

19. The method of claim 1 wherein the correspondence between the first link and second link is maintained according to MLPPP.

* * * * *